(12) United States Patent
Kuroda

(10) Patent No.: US 10,579,094 B2
(45) Date of Patent: Mar. 3, 2020

(54) CONDUCTIVE SHEET

(71) Applicant: DEXERIALS CORPORATION, Tokyo (JP)

(72) Inventor: Daisuke Kuroda, Utsunomiya (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 16/031,032

(22) Filed: Jul. 10, 2018

(65) Prior Publication Data

US 2018/0314290 A1 Nov. 1, 2018

Related U.S. Application Data

(63) Continuation of application No. 14/429,296, filed as application No. PCT/JP2013/075078 on Sep. 18, 2013, now Pat. No. 10,067,527.

(30) Foreign Application Priority Data

Sep. 18, 2012 (JP) .................................. 2012-204506

(51) Int. Cl.
*G06F 1/16* (2006.01)
*B32B 15/06* (2006.01)
(Continued)

(52) U.S. Cl.
CPC ................ *G06F 1/16* (2013.01); *B32B 15/06* (2013.01); *B32B 15/08* (2013.01); *B32B 15/082* (2013.01);
(Continued)

(58) Field of Classification Search
CPC .......... G06F 1/16; G06F 3/0412; G06F 3/041; B32B 15/09; B32B 15/06; B32B 27/302;
(Continued)

(56) References Cited

U.S. PATENT DOCUMENTS 7,261,950 B2    8/2007   Fleming et al.
7,396,583 B2    7/2008   Yoshikai et al.
(Continued)

FOREIGN PATENT DOCUMENTS

CN           1607894 A      4/2005
CN      101069121 A     11/2007
(Continued)

OTHER PUBLICATIONS

Oct. 29, 2013 International Search Report issued in International Application No. PCT/JP2013/075078.
(Continued)

*Primary Examiner* — Vinh T Lam
(74) *Attorney, Agent, or Firm* — Oliff PLC

(57) ABSTRACT

A conductive sheet has a structure in which a conductive adhesive layer laminated on one side of a base substrate and a light-shielding insulating layer laminated on another side of the base substrate. The base substrate has a structure in which the same kind of metal layers are formed on respective sides of a resin film. The light-shielding insulating layer of the conductive sheet has a surface having a surface resistivity of $1.0 \times 10^8$ Ω/square or more, a gloss value of 80% or less, and an optical density of 1 or more.

19 Claims, 4 Drawing Sheets

(51) Int. Cl.
  C09J 7/29    (2018.01)
  G02B 5/20    (2006.01)
  G06F 3/041   (2006.01)
  B32B 15/08   (2006.01)
  C09J 9/02    (2006.01)
  B32B 15/082   (2006.01)
  B32B 15/085   (2006.01)
  B32B 15/088   (2006.01)
  B32B 15/09   (2006.01)
  B32B 15/092   (2006.01)
  B32B 15/095   (2006.01)
  B32B 15/20   (2006.01)
  B32B 25/12   (2006.01)
  B32B 25/16   (2006.01)
  B32B 25/20   (2006.01)
  B32B 27/08   (2006.01)
  B32B 27/20   (2006.01)
  B32B 27/28   (2006.01)
  B32B 27/30   (2006.01)
  B32B 27/32   (2006.01)
  B32B 27/34   (2006.01)
  B32B 27/36   (2006.01)
  B32B 27/38   (2006.01)
(52) U.S. Cl.
  CPC .......... *B32B 15/085* (2013.01); *B32B 15/088* (2013.01); *B32B 15/09* (2013.01); *B32B 15/092* (2013.01); *B32B 15/095* (2013.01); *B32B 15/20* (2013.01); *B32B 25/12* (2013.01); *B32B 25/16* (2013.01); *B32B 25/20* (2013.01); *B32B 27/08* (2013.01); *B32B 27/20* (2013.01); *B32B 27/28* (2013.01); *B32B 27/281* (2013.01); *B32B 27/285* (2013.01); *B32B 27/286* (2013.01); *B32B 27/288* (2013.01); *B32B 27/30* (2013.01); *B32B 27/302* (2013.01); *B32B 27/304* (2013.01); *B32B 27/306* (2013.01); *B32B 27/308* (2013.01); *B32B 27/322* (2013.01); *B32B 27/34* (2013.01); *B32B 27/36* (2013.01); *B32B 27/365* (2013.01); *B32B 27/38* (2013.01); *C09J 7/29* (2018.01); *C09J 9/02* (2013.01); *G02B 5/208* (2013.01); *G06F 3/0412* (2013.01); *B32B 2250/03* (2013.01); *B32B 2250/05* (2013.01); *B32B 2264/108* (2013.01); *B32B 2307/202* (2013.01); *B32B 2307/204* (2013.01); *B32B 2307/206* (2013.01); *B32B 2307/212* (2013.01); *B32B 2307/402* (2013.01); *B32B 2307/4023* (2013.01); *B32B 2307/4026* (2013.01); *B32B 2307/41* (2013.01); *B32B 2307/416* (2013.01); *B32B 2405/00* (2013.01); *B32B 2457/20* (2013.01); *C09J 2201/602* (2013.01); *C09J 2201/622* (2013.01); *C09J 2203/318* (2013.01); *C09J 2400/163* (2013.01)
(58) Field of Classification Search
  CPC ....... B32B 15/085; B32B 27/20; B32B 27/34; B32B 27/36; B32B 27/288; B32B 27/08; B32B 27/30; B32B 15/092; B32B 15/08; B32B 25/16; B32B 15/20; B32B 27/286; B32B 25/12; B32B 27/281; B32B 15/095; B32B 27/28; B32B 27/365; B32B 27/322; B32B 15/082; B32B 27/38; B32B 27/285; B32B 27/308; B32B 15/088; B32B 25/20; B32B 27/304; B32B 27/306; B32B 2307/202; B32B 2264/108; B32B 2307/212; B32B 2307/4026; B32B 2307/206; B32B 2307/402; B32B 2307/204; B32B 2405/00; B32B 2457/20; B32B 2307/4023; B32B 2307/41; B32B 2307/416; B32B 2250/03; B32B 2250/05; B32B 27/32; C09J 7/29; C09J 9/02; C09J 2201/602; C09J 2203/318; C09J 2400/163; C09J 2201/622; G02B 5/208; G02B 5/20

See application file for complete search history.

(56) References Cited

U.S. PATENT DOCUMENTS

| | | |
|---|---|---|
| 8,067,084 B2 | 11/2011 | Yoshikawa et al. |
| 2008/0138597 A1 | 6/2008 | Asai |
| 2009/0123744 A1 | 5/2009 | Husemann et al. |
| 2009/0301654 A1* | 12/2009 | Suzuki .................... B24B 9/146 156/332 |
| 2011/0134617 A1 | 6/2011 | Putsch |
| 2011/0141034 A1 | 6/2011 | Lai et al. |
| 2012/0034453 A1 | 2/2012 | Kim et al. |
| 2012/0044178 A1 | 2/2012 | Song |
| 2012/0223901 A1 | 9/2012 | Kim et al. |
| 2012/0249436 A1 | 10/2012 | Choi et al. |
| 2012/0308815 A1 | 12/2012 | Buzoujima et al. |
| 2013/0162552 A1 | 6/2013 | Huang et al. |
| 2013/0224412 A1 | 8/2013 | Muta et al. |
| 2013/0271388 A1 | 10/2013 | Chu et al. |
| 2014/0120309 A1* | 5/2014 | Ishii .................... B32B 15/08 428/137 |
| 2014/0287642 A1 | 9/2014 | Kumar et al. |

FOREIGN PATENT DOCUMENTS

| | | |
|---|---|---|
| CN | 101752025 A | 6/2010 |
| DE | 10 2004 058 280 A1 | 6/2006 |
| JP | S62227985 A | 10/1987 |
| JP | 2005002532 A | 1/2005 |
| JP | 2007121608 A | 5/2007 |
| JP | 2007272161 A | 10/2007 |
| JP | 2009188007 A | 8/2009 |
| JP | 2010147235 A | 7/2010 |
| JP | 2014-058108 A | 4/2014 |
| KR | 20070094755 A | 9/2007 |
| TW | 200630454 A | 9/2006 |
| TW | 201120511 A | 6/2011 |
| WO | 2006/058914 A1 | 6/2006 |

OTHER PUBLICATIONS

Jan. 15, 2015 Office Action issued in Chinese Patent Application No. 201380048563.1.
Apr. 15, 2016 Extended Search Report issued in European Patent Application No. 13838906.9.
Aug. 12, 2016 Office Action Issued in U.S Appl. No. 14/429,296.
Sep. 30, 2016 Office Action issued in Korean Patent Application No. 2015-7004091.
Sep. 23, 2016 Office Action issued in Taiwanese Patent Application No. 102133857.
Sep. 7, 2016 Office Action issued in Chinese Patent Application No. 201380048563.1.
Mar. 28, 2017 Office Action Issued in U.S Appl. No. 14/429,296.
Mar. 21, 2017 Office Action issued in Korean Patent Application No. 2015-7004091.
Feb. 14, 2017 Office Action issued in Taiwanese Patent Application No. 102133857.
Mar. 8, 2017 Office Action issued in Chinese Patent Application No. 201380048563.1.
Mar. 30, 2017 Office Action issued in Japanese Patent Application No. 2016-101011.
Jul. 26, 2017 Office Action issued in Taiwanese Application No. 102133857.

(56) References Cited

OTHER PUBLICATIONS

Sep. 12, 2017 Office Action issued in Korean Application No. 10-2017-7017004.
Nov. 24, 2017 Office Action Issued in U.S Appl. No. 14/429,296.
Apr. 20, 2018 Office Action issued in Korean Application No. 10-2017-7017004.
May 16, 2018 Office Action issued in European Patent Application No. 13838906.9.
Jun. 21, 2018 Office Action issued in Korean Application No. 10-2017-7017004.
Dec. 11, 2018 Office Action issued in Korean Patent Application No. 10-2018-7021270.
Dec. 25, 2018 Office Action Issued in Japanese Patent Application No. 2017-249440.
Aug. 24, 2018 Office Action Issued in Chinese Patent Application No. 201710487304.9.
Mar. 1, 2019 Office Action Issued in Chinese Patent Application No. 201810167153.3.
Feb. 20, 2019 Office Action issued in Chinese Patent Application No. 201710487304.9.
Aug. 19, 2019 Office Action Issue in Korean Patent Application No. 10-2018-7021270.
Jun. 21, 2019 Office Action Issued in Korean Patent Application No. 2018-7021270.
Jun. 4, 2019 Office Action Issued in Japanese Patent Application No. 2017-249440.
Jul. 2, 2019 Office Action Issued in Chinese Patent Application No. 201810167153.3.
Jun. 28, 2019 Trial Decision Issued in Korean Patent Application No. 10-2017-7017004.
May 28, 2019 Office Action Issued in Chinese Patent Application No. 201710487304.9.
October 23, 2019 Office Action issued in Chinese Patent Application No. 201810167153.3.
Jan. 15, 2020 Office Action issued in Korean Patent Application No. 10-2019-7027301.

\* cited by examiner

EMBODIMENT 1

EMBODIMENT 2

EMBODIMENT 3

EMBODIMENT 4

CONDUCTIVE SHEET

This is a continuation of application Ser. No. 14/429,296 filed Mar. 18, 2015, which is a National Stage Application of PCT/JP2013/075078 filed Sep. 18, 2013, which claims the benefit of JP 2012-204506 filed Sep. 18, 2012.

The entire disclosures of the prior applications are hereby incorporated by reference herein their entirety.

TECHNICAL FIELD

The present invention relates to a conductive sheet suitable for a case where a display operation face of a display operation panel and a back face thereof are electrically continuous.

BACKGROUND ART

As a conventional electromagnetic wave-shielding tape, a conductive sheet having a conductive adhesive layer on one side of a foil of metal such as aluminum and copper has been proposed (Patent Literature 1). In order to prevent occurrence of short circuit due to contact of such a conductive sheet with another conductive body, or the like, a polyethylene terephthalate (PET) film is laminated as an insulating resin layer on a side without a conductive adhesive layer of the conductive sheet to impart improvement of giving insulating properties to one side of the conductive sheet. By bonding a release film to the conductive adhesive layer, the handleability is improved.

In recent years, a display operation panel (i.e., touch panel) is applied to a smartphone, a portable game console, a ticket selling machine, or the like, and a conductive sheet is used for electrical continuity between a display operation face and a back face thereof. In order to prevent occurrence of short circuit due to unintended contact of such a conductive sheet with another conductive body such as a metal housing, an insulating resin film is laminated on one side to impart insulating properties to the side. When the display operation face of the display operation panel and the back face are electrically continuous using such a conductive sheet, an attempt has been made to cover an outer edge of the display operation panel so that the insulating resin film of the conductive sheet is outside. In this case, in order to improve quality of an image viewed through the display operation panel or prevent a reduction in image visibility, an attempt has been made to color the insulating resin film itself in black or form a black printing layer on the insulating resin film so that the insulating resin film of the conductive sheet serves as a black frame.

CITATION LIST

Patent Literature

Patent Literature 1: Japanese Patent Application Laid-Open No. Sho. 62-227985

SUMMARY OF INVENTION

Technical Problem

However, when the conductive sheet in Patent Literature 1 passes through a coater or the release film is peeled from the conductive sheet, a metal layer is likely to be plastically deformed as compared with the PET film, and the PET film is likely to be elastically deformed. Therefore, there is a problem in which the conductive sheet is likely to curl. When the conductive sheet is bonded to the display operation panel so as to cover the outer edge of the display operation panel, the followability of the conductive sheet to a step of a bonding portion or a shape of a corner is not sufficient. Therefore, there are also problems in which the conductive sheet is likely to be peeled and necessary shape retentivity is not achieved.

An object of the present invention is to solve the above-described problems in the conventional techniques, and to hardly generate curl in a conductive sheet, and impart good shape stability and shape followability to the conductive sheet obtained by laminating a conductive adhesive layer on one side of a base substrate and laminating a light-shielding insulating layer on another side of the base substrate.

Solution to Problem

The present inventor has found that when a layered body in which the same kind of metal layers are laminated on respective sides of a resin film is used as a base substrate that is a center part of a conductive sheet in a thickness-wise direction, the object can be achieved. Thus, the present invention has been completed.

Specifically, the present invention provides a conductive sheet having a base substrate, a conductive adhesive layer laminated on one side of the base substrate and a light-shielding insulating layer laminated on another side of the base substrate, wherein the base substrate has a structure in which the same kind of metal layers are formed on respective sides of a resin film.

In this case, as a level of insulating properties of a surface of the light-shielding insulating layer of the conductive sheet, the surface resistivity is preferably $1.0 \times 10^8$ Ω/square or more. As a level of light-shielding properties, the gloss value is preferably 80% or less and the optical density is preferably 1 or more.

The present invention further provides an image display module having: a display operation panel in which a top electrode provided on an outer edge of a surface of the display operation panel and a back electrode provided on an outer edge of a back face are connected via the conductive sheet of the present invention that is disposed so as to surround the outer edge of the display operation panel; and an image display panel that is operated by the display operation panel.

Advantageous Effects of Invention

In the conductive sheet of the present invention having a base substrate, a conductive adhesive layer laminated on one side of a base substrate and a light-shielding insulating layer laminated on another side of the base substrate, a substrate having a structure in which the same kind of metal layers are formed on respective sides of a resin film is used as the base substrate. Therefore, even when a tension is applied to the conductive sheet, generation of curl can be largely suppressed. This is because the metal layers on respective sides of the resin film show the same coefficients of extension. Further, since the metal layers are disposed on respective sides of the resin film, the sheet can be bonded with shape followability that is good for a changed shape such as a curved surface and a refracted part (corner), and the shape retentivity is excellent.

When the level of insulating properties of the surface of the light-shielding insulating layer of the conductive sheet is a surface resistivity of $1.0 \times 10^8$ Ω/square or more, occurrence of short circuit due to contact with another conductive body can be suppressed. When the level of light-shielding properties is set such that the gloss value thereof is 80% or less and the optical density thereof is 1 or more, a black mat frame can be provided on an outer edge of a display operation panel, and the visibility of an image observed through the display operation panel can be largely improved.

DESCRIPTION OF EMBODIMENTS

Hereinafter, the conductive sheet of the present invention will be described in detail with reference to the drawings.

Figure 1:
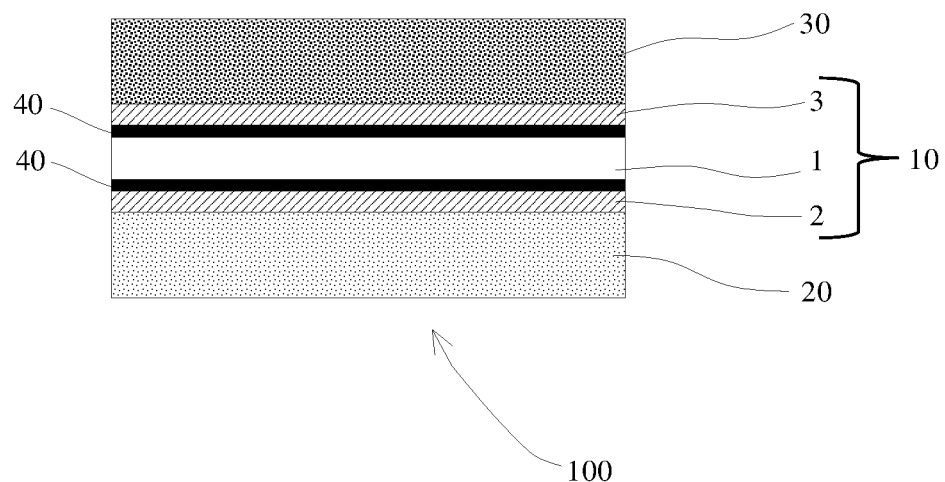
FIG. 1 is a cross-sectional view of a conductive sheet of the present invention.

FIG. 1 is a cross-sectional view of a conductive sheet 100 of the present invention. This conductive sheet 100 has a structure in which a conductive adhesive layer 20 is formed on one side of a base substrate 10 and a light-shielding insulating layer 30 is formed on another side.

<Base Substrate>

In the conductive sheet 100 of the present invention, the base substrate 10 is characterized by having a structure in which the same kind of metal layers 2 and 3 are laminated on respective sides of a resin film 1. Therefore, generation of curl in the conductive sheet can be largely suppressed, and good followability and shape stability can be imparted to the conductive sheet.

As the resin film 1 constituting the base substrate 10, a resin film used as a base film of the conductive sheet can be preferably used. Examples of such a resin film may include polyester films, polyolefin films, polyamide films, polyurethane films, and polystyrene films. Among them, the polyester films, and especially a polyethylene terephthalate film can be preferably used from the viewpoints of availability, mechanical strength, heat resistance, cost, and rust prevention.

In order to retain the mechanical strength of the conductive sheet, and achieve good shape followability and shape stability, the thickness of the resin film 1 constituting the base substrate 10 is preferably 5 to 20 μm, and more preferably 7 to 15 μm.

As the metal layers 2 and 3 constituting the base substrate 10, a metal layer used as a conventional conductive sheet can be preferably used. For such metal layers 2 and 3, aluminum, copper, nickel, gold, silver, and the like may be exemplified. Among them, aluminum can be preferably used from the viewpoints of availability, mechanical strength, heat resistance, cost, and rust prevention.

In order to retain the mechanical strength of the conductive sheet, and achieve good shape followability and shape stability, the thickness of each of the metal layer 2 on a side of the conductive adhesive layer 20 and the metal layer 3 on a side of the light-shielding insulating layer 30 is preferably 5 to 20 μm, and more preferably 7 to 15 μm.

The ratio [Mt1]:[Bt]:[Mt2] of the thickness [Mt1] of the metal layer 2 on the conductive adhesive layer 20 side, the thickness [Bt] of the resin film 1, and the thickness [Mt2] of the metal layer 3 on the light-shielding insulating layer 30 side is preferably 0.25 to 4:1:0.25 to 4, and more preferably 0.4 to 2.4:1:0.4 to 2.4 from the viewpoints of balance of shape followability and shape retentivity.

The metal layers 2 and 3 can be formed on the resin film 1 by a conventional method. Examples of the method may include a method of laminating metal foils as metal layers on the resin film 1 via an adhesive layer 40 that is formed from a dry adhesive such as a polyester-based adhesive and a polyurethane-based adhesive that contain an isocyanate-based cross-linker, a method of forming the metal layers 2 and 3 on respective sides of the resin film 1 by electroless metal plating, followed by electrolytic metal plating, and a method of laminating the metal layers 2 and 3 on respective sides of the resin film 1 by a vacuum deposition method. Among them, the method of laminating the metal layers via the adhesive layer can be preferably applied in terms of high mass productivity and low production cost.

When the linear expansion coefficient [ppm/° C.] of the resin film 1 constituting the base substrate 10 is too large, curl is likely to be generated. When it is too small, a layered structure becomes unstable in a heat environment. From this trend, delamination may occur. Therefore, the linear expansion coefficient of the resin film 1 is preferably 15 to 100 ppm/° C., and more preferably 20 to 70 ppm/° C.

The linear expansion coefficient [ppm/° C.] of the metal layers 2 and 3 is preferably 12 to 25 ppm/° C., and more preferably 16 to 23 ppm/° C. from the viewpoint of stability of the layered structure with the resin film 1.

When the difference between the linear expansion coefficient of the resin film 1 and the linear expansion coefficient of the metal layers 2 and 3 is too large, curl tends to be easily generated. Therefore, the difference is preferably 40 ppm/° C. or less, and more preferably 25 ppm/° C. or less.

When the modulus of elongation [GPa] of the resin film 1 constituting the base substrate 10 in accordance with JIS K7113 is too small, the conductive sheet tends to easily curl. When it is too large, the shape followability tends to be deteriorated. Therefore, the modulus of elongation of the resin film 1 is preferably 0.3 to 15 GPa, and more preferably 2 to 7 GPa.

When the modulus of elongation [GPa] of the metal layers 2 and 3 in accordance with JIS K7113 is too small, the conductive sheet tends to easily curl. When it is too large, the shape followability tends to be deteriorated. Therefore, the modulus of elongation of the metal layers 2 and 3 is preferably 45 to 200 GPa, and more preferably 75 to 130 GPa.

When the difference of modulus of elongation in accordance with JIS K7113 between the resin film 1 and the metal layers 2 and 3, which constitute the base substrate 10, is too large, curl tends to be easily generated. Therefore, the difference is preferably 100 GPa or less, and more preferably 80 GPa or less.

<Light-Shielding Insulating Layer>

The light-shielding insulating layer 30 constituting the conductive sheet 100 of the present invention is a layer of imparting light-shielding properties and insulating properties to the conductive sheet 100. Herein, when the level of insulating properties of the surface of the light-shielding insulating layer 30 of the conductive sheet 100 is too low, short circuit may occur. Therefore, the surface resistivity is preferably $1.0 \times 10^8$ Ω/square or more, and more preferably $1.0 \times 10^{10}$ Ω/square or more.

In order to improve the visibility of an image, as the level of light-shielding properties of the light-shielding insulating layer 30, the gloss value in accordance with JIS Z8741 (incidence angle: 60° C.) is preferably 80% or less, and more preferably 40% or less, and the optical density in accordance with JIS K7605 is preferably 1 or more, more preferably 1.2 or more, and further preferably 1.4 or more.

When the thickness of the light-shielding insulating layer 30 is too small, intended optical characteristics tend to be deteriorated. When it is too large, a crack tends to be generated. Therefore, the thickness of the light-shielding insulating layer 30 is preferably 3 to 15 μm, and more preferably 5 to 11 μm.

Such a light-shielding insulating layer 30 may have various configurations in which the surface resistivity, gloss value, and optical density of the surface fall within the above-described ranges. Examples thereof may include a configuration that is a black resin layer of single layer that is formed from an insulating resin colored by a black colorant, as shown in FIG. 1, and a configuration that includes a black resin layer 30a formed from an insulating resin colored by a black colorant, and an insulating primer layer 30b or a mat varnish layer 30c that is formed on one side thereof, as shown in FIG. 2 or 3.

Examples of the insulating resin in the black resin layer constituting the light-shielding insulating layer 30 may include polyethylene, polypropylene, ethylene-α-olefin copolymers such as ethylene-propylene copolymers, polymethyl pentene, polyvinyl chloride, polyvinylidene chloride, polyvinyl acetate, ethylene-vinyl acetate copolymers, polyvinyl alcohol, polyvinyl acetal, fluorine-containing polymers such as polyvinylidene fluoride and polytetrafluoroethylene, polyethylene terephthalate, polybutylene terephthalate, polyethylene naphthalate, polystyrene, polyacrylonitrile, styrene-acrylonitrile copolymers, acrylonitrile-butadiene-styrene copolymer (ABS) resins, polyphenylene-ether copolymer (PPE) resins, modified PPE resins, aliphatic polyamides, aromatic polyamides, polyimide, polyamide imide, polymethacrylic acid, polymethacylic acid esters such as polymethyl methacrylate, polyacrylic acids, polycarbonate, polyphenylene sulfide, polysulfone, polyether sulfone, polyether nitrile, polyether ketone, polyketone, liquid crystal polymers, silicone resins, and thermoplastic resins such as an ionomer. Further, examples thereof may include styrene-butadiene block copolymers and hydrogenated products thereof, styrene-isoprene block copolymers and hydrogenated products thereof, and thermoplastic elastomers such as styrenic thermoplastic elastomers, olefinic thermoplastic elastomers, vinyl chloride-based thermoplastic elastomers, polyester-based thermoplastic elastomers, polyurethane-based thermoplastic elastomers, and polyamide-based thermoplastic elastomers. In addition, examples thereof may include cross-linked rubbers, epoxy resins, phenolic resins, polyimide resins, unsaturated polyester resins, and diallyl phthalate resins. Specific examples of the cross-linked rubber may include thermosetting resins such as natural rubbers, acrylic rubbers, butadiene rubbers, isoprene rubbers, styrene-butadiene copolymer rubbers, nitrile rubbers, hydrogenated nitrile rubbers, chloroprene rubbers, ethylene-propylene copolymer rubbers, chlorinated polyethylene rubbers, chlorosulfonated polyethylene rubbers, butyl rubbers, halogenated butyl rubbers, fluoro rubbers, urethane rubbers, and silicone rubbers. Light-curable resins can be also applied.

Examples of the black colorant may include known black dyes and black pigments, such as aniline black, carbon black, and black titanium oxide. When the average particle diameter of the colorant is too small, a probability in which it is difficult that the colorant is uniformly mixed in the insulating resin during production tends to increase. When it is too large, the smoothness of the light-shielding insulating layer 30 tends to decrease. Therefore, the average particle diameter of the colorant is preferably 10 to 500 nm, and more preferably 50 to 100 nm. When the content of the black colorant in the black resin layer is too small, intended optical characteristics tend not to be achieved. When it is too large, adhesion to an adjacent layer may be reduced or the resin layer may be separated. Therefore, the content of the black colorant in the black resin layer is preferably 10 to 40% by mass, and more preferably 15 to 30% by mass.

Figure 2:
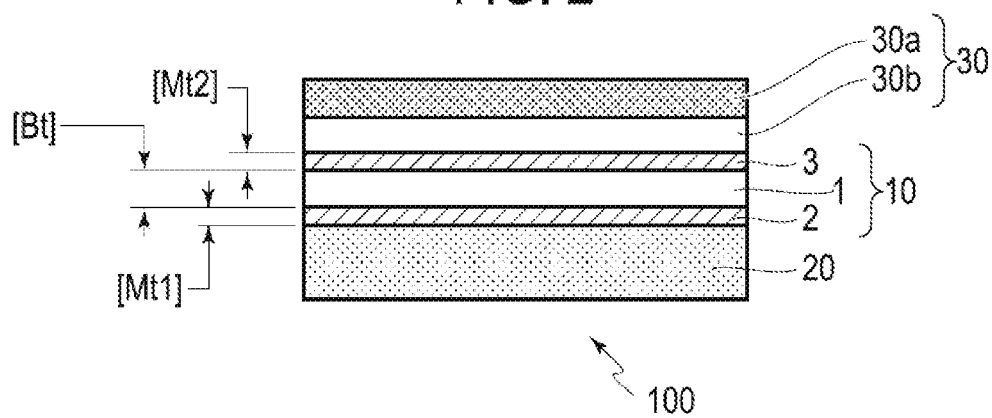
FIG. 2 is a cross-sectional view of a conductive sheet of the present invention.
Figure 3:
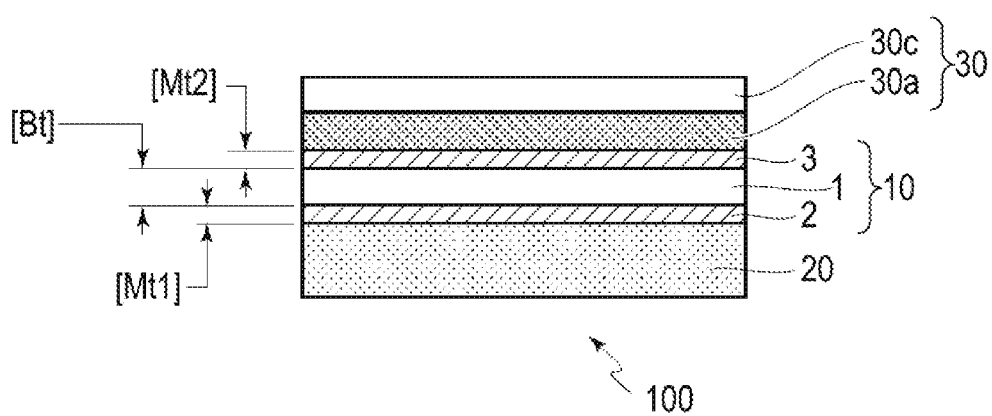
FIG. 3 is a cross-sectional view of a conductive sheet of the present invention.

Examples of the insulating primer layer 30b shown in FIG. 2 may include a layer in which fillers such as silica are mixed in the insulating resin exemplified in the black resin layer, if necessary, to prevent blocking.

When the thickness of the insulating primer layer 30b is too small, intended insulating properties tend not to be achieved. When it is too large, intended shape retentivity tends not to be achieved. Therefore, the thickness of the insulating primer layer 30b is preferably 2 to 10 μm, and more preferably 3 to 7 μm.

Examples of the mat varnish layer 30c shown in FIG. 3 may include a film formed by mixing fillers having an average particle diameter of 0.1 to 10 μm, such as silica, barium sulfate, calcium carbonate, polyethylene beads, polystyrene beads, and benzoguanamine beads, preferably in a content of 30 to 80% by mass, in the insulating resin exemplified in the black resin layer to achieve good balance between a preferred mat appearance and good coating film strength.

When the thickness of the mat varnish layer 30c is too small, intended insulating properties tend not to be achieved. When it is too large, intended shape retentivity and optical characteristics tend not to be achieved. Therefore, the thickness of the mat varnish layer 30c is preferably 2 to 10 μm, and more preferably 3 to 7 μm.

When the light-shielding insulating layer 30 is a black resin layer of single layer as shown in FIG. 1, it is preferable that aniline black be used as the black colorant. This is because the black colorant itself is insulative. When the light-shielding insulating layer 30 has a two-layer structure as shown in FIG. 2 or 3, aniline black may be used as the black colorant of the black resin layer 30a. However, carbon black that is conductive may be used within a range not impairing the effects of the present invention. This is because there are the insulating primer layer 30b and the mat varnish layer 30c that secure insulating properties.

<Conductive Adhesive Layer>

As the conductive adhesive layer 20 constituting the conductive sheet 100, a conductive adhesive layer of the conventional conductive sheet can be used. Examples thereof may include a film formed by mixing conductive particles such as carbon black and metal particles in an amount sufficient to achieve such conductivity that the surface resistivity is 500 mΩ/square or less in the insulating resin exemplified in the black resin layer.

When the thickness of the conductive adhesive layer 20 is too small, intended adhesive properties tend not to be achieved. When it is too large, intended electrical continuity tends not to be achieved. Therefore, the thickness of the conductive adhesive layer 20 is preferably 10 to 35 µm, and more preferably 15 to 25 µm.

<Production of Conductive Sheet>

The conductive sheet of the present invention can be produced through a known procedure. For example, a dry adhesive such as a urethane-based adhesive containing an isocyanate curing agent is applied to one side of a resin film such as a PET film, and a metal layer such as aluminum foil is laminated. After that, a dry adhesive is applied to another side, and a metal layer is laminated in the same manner. Thus, a base substrate having the metal layers laminated on respective sides is formed. Subsequently, a coating for a conductive adhesive layer is applied to a release sheet, and dried to form a conductive adhesive layer, and the base substrate is laminated on the conductive adhesive layer. Next, a black ink for formation of a black resin layer is applied to the base substrate, and dried to form a light-shielding insulating layer. Thus, the conductive sheet in FIG. 1 is obtained.

The conductive sheets in FIGS. 2 and 3 can be produced basically in the same manner as in a case of the conductive sheet in FIG. 1 except that a black resin layer, a mat varnish layer, and an insulating primer layer are each formed by applying and drying.

Figure 4:
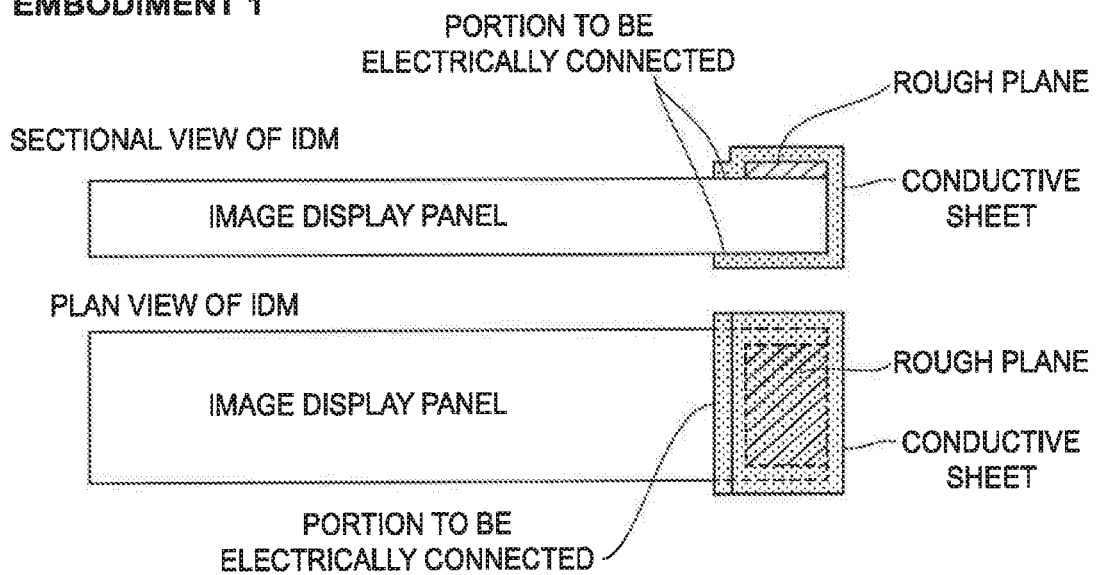
FIG. 4 illustrates image display modules (via a respective sectional view of IDM in which the individual components are not drawn to scale) in accordance with various embodiments (EMBODIMENT 1, EMBODIMENT 2, and EMBODIMENT 4) of the present invention.
Figure 4:
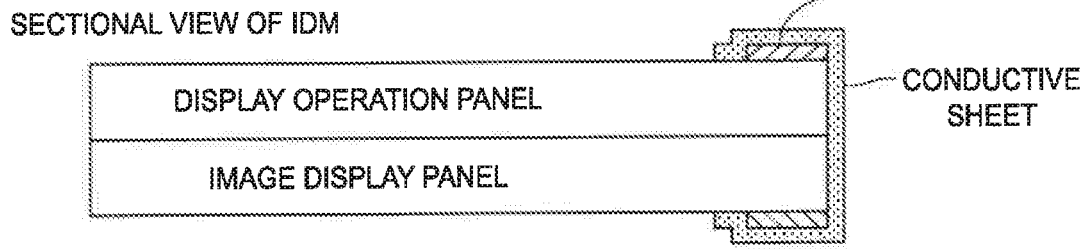
Figure 4:
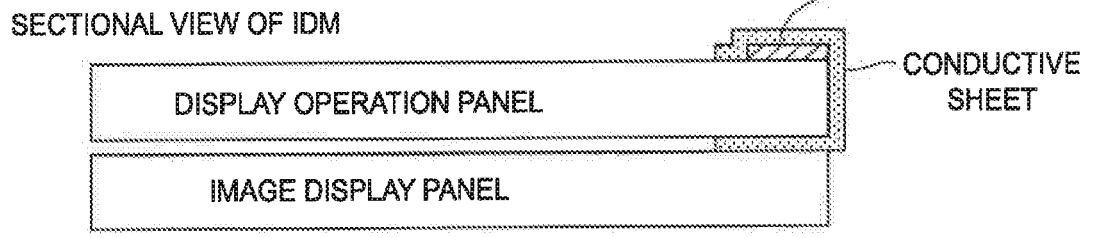
Figure 5:
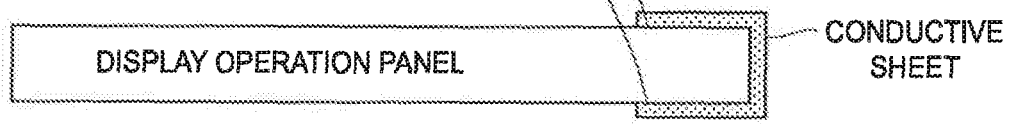
FIG. 5 illustrates image display modules (via a respective sectional view of IDM in which the individual components are not drawn to scale) in accordance with various embodiments (EMBODIMENT 1, EMBODIMENT 2, EMBODIMENT 3, and EMBODIMENT 4) of the present invention.
Figure 5:
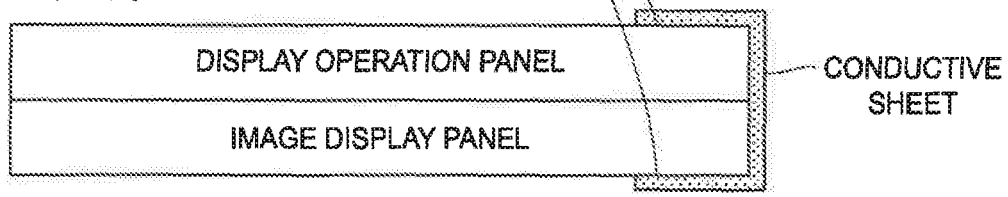
Figure 5:
Figure 5:

The conductive sheet of the present invention can be preferably applied to an image display module in which a portion to be electrically connected is disposed in a rough plane as illustrated in the embodiments (EMBODIMENT 1, EMBODIMENT 2, and EMBODIMENT 3) shown in FIG. 4, or an image display module in which portions to be electrically connected are disposed on respective different planes as illustrated in the embodiments (EMBODIMENT 1, EMBODIMENT 2, EMBODIMENT 3, and EMBODIMENT 4) shown in FIG. 5.

Examples of the former may include an image display module in which a display panel such as a notebook computer is disposed so as to be connected to a substrate separately provided across any bend portion and step using the conductive sheet. The image display module illustrated by this notebook computer is also part of the invention of the present application.

Figure 6:
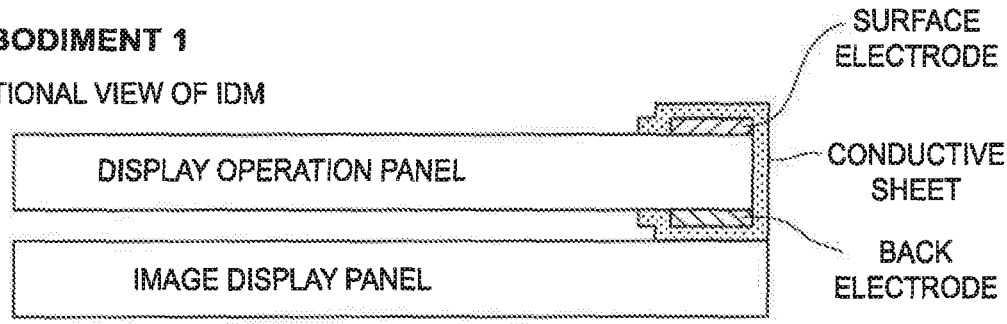
FIG. 6 illustrates image display modules (via a respective sectional view of IDM in which the individual components are not drawn to scale) in accordance with various embodiments (EMBODIMENT 1, EMBODIMENT 2, and EMBODIMENT 3) of the present invention.
Figure 6:
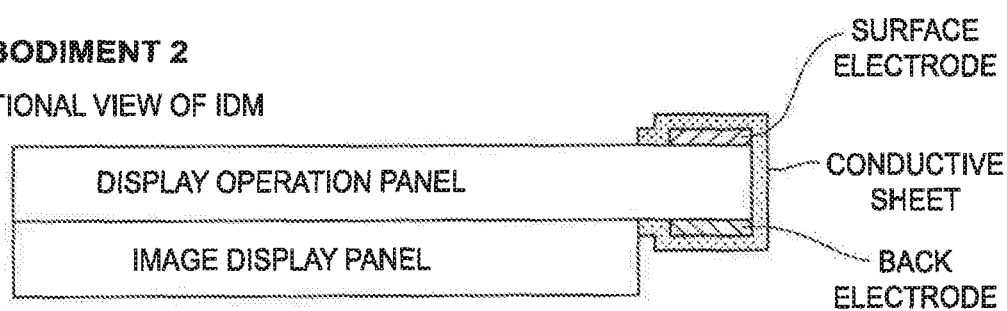
Figure 6:
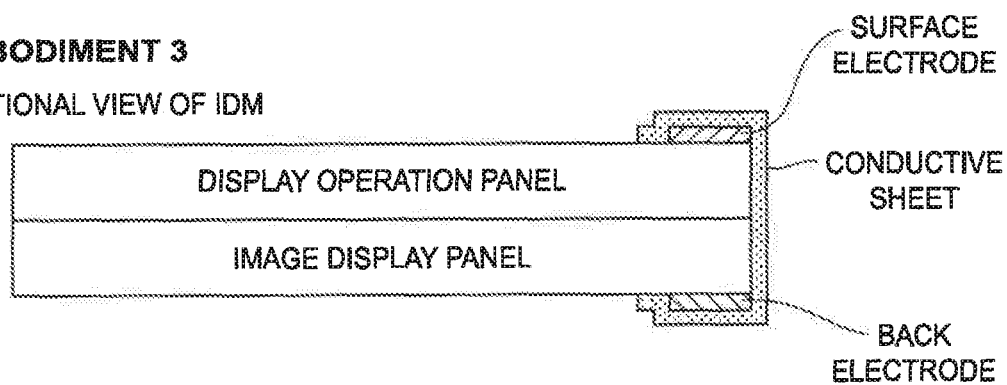

Examples of the latter may include an image display module as illustrated in the embodiments (EMBODIMENT 1, EMBODIMENT 2, and EMBODIMENT 3) shown in FIG. 6 formed by combining a display operation panel, such as a touch panel, in which a top electrode provided on an outer edge of the surface of the display operation panel and a back electrode provided on an outer edge of a back face are connected and disposed so as to surround the outer edge of the display operation panel with the conductive sheet with an image display panel to be operated, such as a liquid-crystal display panel. The image display module is also part of the invention of the present application.

EXAMPLES

Example 1

3 g/m² (in terms of dry coating amount) of polyester resin (UE3220, available from UNITIKA LTD.) using an isocyanate-based curing agent (CORONATE L, available from Nippon Polyurethane Industry Co., Ltd.) was applied to one side of a PET film (Mylar, available from Teijin DuPont Films Japan Limited) with a thickness of 5 µm, and a soft aluminum foil (1030N-0, available from Nippon Foil Mfg. Co., Ltd.) with a thickness of 7 µm was laminated thereon. A soft aluminum foil (1030N-0, available from Nippon Foil Mfg. Co., Ltd.) with a thickness of 7 µm was laminated on another side of the PET film in the same manner to form a base substrate.

A black conductive adhesive (acrylic adhesive containing 10% by mass of carbon black) was applied to a release PET film so that the dried thickness was 25 µm, and dried to form a black conductive adhesive layer. The base substrate previously formed was laminated on the black conductive adhesive layer.

Subsequently, a black insulating ink (ink (available from Dexerials Corporation) obtained by dispersing aniline black (available from Tokyo Shikizai Industry Co., Ltd.) in a polyester resin (VYLON 200, available from Toyobo Co., Ltd.)) was applied to the base substrate so that the dried thickness was 3 µm, and dried to form a light-shielding insulating layer. Thus, a conductive sheet having the configuration shown in Table 1 was obtained.

Example 2

A conductive sheet having a configuration shown in Table 1 was obtained by repeating the same operations as in Example 1 except that a PET film (E5100, available from Toyobo Co., Ltd.) with a thickness of 12 µm was used instead of the PET film with a thickness of 5 µm in the base substrate.

Example 3

A conductive sheet having a configuration shown in Table 1 was obtained by repeating the same operations as in Example 1 except that a layered body of an insulating primer layer (polyester resin (VYLON200, available from Toyobo Co., Ltd.)) with a thickness of 3 µm from a side of the base substrate and a black carbon black ink layer (ink (available from Dexerials Corporation) obtained by dispersing carbon black (MA8, available from Mitsubishi Chemical Corporation) in a polyester resin (VYLON 200, available from Toyobo Co., Ltd.)) formed on the layer was used as the light-shielding insulating layer.

Example 4

A conductive sheet having a configuration shown in Table 1 was obtained by repeating the same operations as in Example 1 except that a layered body of a black carbon black ink layer with a thickness of 3 µm (ink (available from Dexerials Corporation) obtained by dispersing carbon black (MA8, available from Mitsubishi Chemical Corporation) in a polyester resin (VYLON 200, available from Toyobo Co., Ltd.)) and a mat varnish layer (LG 6620, available from Tokyo Printing Ink Mfg. Co., Ltd.) with a thickness of 3 µm from a side of the base substrate was used as the light-shielding insulating layer.

Comparative Example 1

A conductive sheet having a configuration shown in Table 1 was obtained by repeating the same operations as in Example 1 except that a black carbon black ink layer with a thickness of 3 µm (ink (available from Dexerials Corporation) obtained by dispersing carbon black (MA8, available from Mitsubishi Chemical Corporation) in a polyester resin (VYLON 200, available from Toyobo Co., Ltd.)) was used as the light-shielding insulating layer.

Comparative Example 2

A conductive sheet having a configuration shown in Table 1 was obtained by repeating the same operations as in Comparative Example 1 except that the urethane-based adhesive used in Example 1 was applied to the metal layer of the base substrate before formation of the black carbon black ink layer, and a PET film (Mylar, available from Teijin DuPont Films Japan Limited) with a thickness of 5 μm was laminated thereon, and then the black carbon black ink layer was formed.

Comparative Example 3

A conductive sheet having a configuration shown in Table 1 was obtained by repeating the same operations as in Comparative Example 2 except that a PET film (E5100, available from Toyobo Co., Ltd.) with a thickness of 12 μm was used instead of the PET film with a thickness of 5 μm interposed between aluminum foils in the base substrate.

Comparative Example 4

A conductive sheet having a configuration shown in Table 1 was obtained by repeating the same operations as in Comparative Example 1 except that a PET film with a thickness of 5 μm on one side of which the soft aluminum foil laminated via an adhesive used in Example 1 was used as the base substrate, and a layered body of a black carbon black ink layer (ink (available from Dexerials Corporation) obtained by dispersing carbon black (MA8, available from Mitsubishi Chemical Corporation) in a polyester resin (VYLON 200, available from Toyobo Co., Ltd.)) was directly used on a side of the base substrate where no soft aluminum foil was laminated.

Comparative Example 5

A conductive sheet having a configuration shown in Table 1 was obtained by repeating the same operations as in Comparative Example 4 except that a PET film (E5100, available from Toyobo Co., Ltd.) with a thickness of 12 μm was used instead of the PET film with a thickness of 5 μm in the base substrate.

Comparative Example 6

A conductive sheet having a configuration shown in Table 1 was obtained by repeating the same operations as in Comparative Example 4 except that a conductive non-woven fabric-enhanced adhesive film (Sui-80-M30, available from Seiren Co., Ltd.) with a thickness of 30 μm was laminated instead of the formation of the conductive adhesive layer on the release PET film.

Comparative Example 7

A conductive sheet having a configuration shown in Table 1 was obtained by repeating the same operations as in Comparative Example 6 except that a PET film (E5100, available from Toyobo Co., Ltd.) with a thickness of 12 μm was used instead of the PET film with a thickness of 5 μm interposed between aluminum foils in the base substrate.

<Evaluation>

"Curl characteristics," "shape retentivity," "shape followability (repulsion)," "insulating properties (surface resistivity)," and "light-shielding properties (gloss value and optical density)" in the resulting conductive sheets were tested and evaluated, as described below. The obtained results are shown in Table 1.

"Curl Characteristics"

In a testing sample in which the conductive sheet was cut into a strip with a width of 15 mm and a length of 150 mm, a release sheet on a side of the conductive adhesive layer was peeled in a direction of 180° at a rate of 1,000 mm/sec, and resulting curl was visually observed. A case where the resulting curl is within one rotation is judged to be good, and a case where the curl exceeds one rotation is judged to be poor.

"Shape Retentivity"

In a testing sample in which the conductive sheet was cut into a strip with a width of 15 mm and a length of 50 mm, a release sheet on a side of the conductive adhesive layer was peeled in a direction of 180° at a rate of 1,000 mm/sec, and bent at 90° at a center of the sample on a side of the light-shielding insulating layer. A shape to be retained in this state for 10 seconds was visually observed. A case where the shape is retained is judged to be good, and a case where the shape is not retained is judged to be poor.

"Shape Followability (Repulsion)"

In a testing sample in which the conductive sheet was cut into a rectangle with a length of 15 mm and a width of 10 mm, a release sheet on a side of the conductive adhesive layer was removed. A long side of the sample was bonded to an aluminum plate so that a portion with a thickness of 1 mm of the aluminum plate was surrounded and a 1-mm edge on a surface of the aluminum plate was covered. The rest was bent at 90° and bonded to a back face of the aluminum plate. After the sample was left in an environment of 80° C. and 95% RH for 72 hours, the presence or absence of peeling was visually observed. A case where peeling does not occur is judged to be good, and a case where peeling occurs is judged to be poor.

"Insulating Properties (Surface Resistivity)"

The surface resistance of a surface of the light-shielding insulating layer of the conductive sheet was measured with a resistivity meter (Hiresta, manufactured by Mitsubishi Chemical Analytech, Co., Ltd.). The surface resistivity is required to be $1 \times 10^8$ Ω/square or more in practical terms.

"Light-Shielding Properties (Gloss Level and Optical Density)"

The gloss value of the light-shielding insulating layer surface of the conductive sheet was measured with a gloss value meter (Gloss Checker IG-320, manufactured by Horiba, Ltd.) in accordance with JIS Z8741 (angle of incidence: 60°). The gloss value is required to be 80% or less in practical terms. The optical density of the light-shielding insulating layer surface was measured with an optical density meter (reflection density meter RT924, manufactured by Macbeth) in accordance with JIS K7605. The optical density is required to be 1.4 or more in practical terms. A case where both the performances are satisfied is judged to be good.

For conductivity of the conductive adhesive layer of the conductive sheet in each of Examples 1 to 4 and Comparative Examples 1 to 5 and the conductive non-woven fabric-enhanced adhesive film in each of Comparative Examples 6 and 7, a sample cut into a strip of 100×25 mm was bonded to end portions of two copper foils (1×25×100 mm) that were disposed in parallel at an interval of 50 mm so as to be bridged, and the resistance value between the two copper foils was measured with an electrical resistance meter (Milliohm Meter 4332B, manufactured by Agillent). The results of all the samples represent a value as very low as 50 to 60 mΩ, which is largely less than 500 μmΩ.

TABLE 1

| | EXAMPLE | | | | COMPARATIVE EXAMPLE | |
|---|---|---|---|---|---|---|
| | 1 | 2 | 3 | 4 | 1 | 2 |
| LIGHT-SHIELDING INSULATING LAYER | BLACK INSULATING INK | BLACK INSULATING INK | BLACK CARBON BLACK INK INSULATING PRIMER | MAT VARNISH BLACK CARBON BLACK INK | BLACK CARBON BLACK INK | BLACK CARBON BLACK INK |
| BASE SUBSTRATE | — 7-μm Al FOIL 5-μm PET 7-μm Al FOIL | — 7-μm Al FOIL 12-μm PET 7-μm Al FOIL | — 7-μm Al FOIL 5-μm PET 7-μm Al FOIL | — 7-μm Al FOIL 5-μm PET 7-μm Al FOIL | — 7-μm Al FOIL 5-μm PET 7-μm Al FOIL | 5-μm PET 7-μm Al FOIL 5-μm PET 7-μm Al FOIL |
| CONDUCTIVE ADHESIVE LAYER | 25-μm THICK BLACK CONDUCTIVE ADHESIVE | 25-μm THICK BLACK CONDUCTIVE ADHESIVE | 25-μm THICK BLACK CONDUCTIVE ADHESIVE | 25-μm THICK BLACK CONDUCTIVE ADHESIVE | 25-μm THICK BLACK CONDUCTIVE ADHESIVE | 25-μm THICK BLACK CONDUCTIVE ADHESIVE |
| CURL CHARACTERISTICS | GOOD | GOOD | GOOD | GOOD | GOOD | POOR |
| SHAPE RETENTIVITY | GOOD | GOOD | GOOD | GOOD | GOOD | GOOD |
| SHAPE FOLLOWABILITY | GOOD | GOOD | GOOD | GOOD | GOOD | GOOD |
| INSULATING PROPERTIES (Ω/Sq.) | $3.0 \times 10^8$ | $1.9 \times 10^9$ | $1.0 \times 10^8$ | $1.0 \times 10^{11}$ | $<1.0 \times 10^6$ | $5.7 \times 10^8$ |
| LIGHT-SHIELDING PROPERTIES GLOSS VALUE (%) | 30.0 | 30.0 | 40.0 | 10.0 | 40.0 | 40.0 |
| OPTICAL DENSITY | 1.3 | 1.3 | 1.4 | 1.3 | 1.4 | 1.4 |

| | | COMPARATIVE EXAMPLE | | | | |
|---|---|---|---|---|---|---|
| | | 3 | 4 | 5 | 6 | 7 |
| | LIGHT-SHIELDING INSULATING LAYER | BLACK CARBON BLACK INK | BLACK CARBON BLACK INK | BLACK CARBON BLACK INK | BLACK CARBON BLACK INK | BLACK CARBON BLACK INK |
| | BASE SUBSTRATE | 5-μm PET 7-μm Al FOIL 12-μm PET 7-μm Al FOIL | — 5-μm PET 7-μm Al FOIL | — 12-μm PET 7-μm Al FOIL | — 5-μm PET 7-μm Al FOIL | — 12-μm PET 7-μm Al FOIL |
| | CONDUCTIVE ADHESIVE LAYER | 25-μm THICK BLACK CONDUCTIVE ADHESIVE | 25-μm THICK BLACK CONDUCTIVE ADHESIVE | 25-μm THICK BLACK CONDUCTIVE ADHESIVE | 30-μm THICK CONDUCTIVE NON-WOVEN FABRIC-ENHANCED ADHESIVE FILM | 30-μm THICK CONDUCTIVE NON-WOVEN FABRIC-ENHANCED ADHESIVE FILM |
| | CURL CHARACTERISTICS | POOR | POOR | POOR | GOOD | GOOD |
| | SHAPE RETENTIVITY | GOOD | POOR | POOR | POOR | POOR |
| | SHAPE FOLLOWABILITY | POOR | GOOD | GOOD | POOR | POOR |
| | INSULATING PROPERTIES (Ω/Sq.) | $6.4 \times 10^8$ | $6.4 \times 10^8$ | $6.5 \times 10^8$ | $7.0 \times 10^8$ | $6.5 \times 10^8$ |
| | LIGHT-SHIELDING PROPERTIES GLOSS VALUE (%) | 40.0 | 40.0 | 40.0 | 40.0 | 40.0 |
| | OPTICAL DENSITY | 1.4 | 1.4 | 1.4 | 1.4 | 1.4 |

In all evaluation items of the conductive sheets in Examples 1 to 4, good results are obtained.

In contrast, in the conductive sheet in Comparative Example 1, a black insulating ink was not used, and the light-shielding insulating layer was formed using a black carbon black ink exhibiting conductivity. Therefore, the surface resistivity is low and insulating properties exhibited are not satisfied in practical terms.

In the conductive sheet in Comparative Example 2, a black insulating ink was not used, and the light-shielding insulating layer was formed using a black carbon black ink, but the insulating PET film was disposed under the black carbon black ink layer. Therefore, good insulating properties are exhibited, but symmetry in the thickness-wise direction of the base substrate is lost. Accordingly, a problem of curl characteristics arises.

In the conductive sheet in Comparative Example 3, the thickness of the resin film in the base substrate of the conductive sheet in Comparative Example 2 was increased from 5 μm to 12 μm. Therefore, symmetry in the thickness-wise direction of the base substrate is lower than that in Comparative Example 2, and as a result, a problem of shape followability arises.

In all the conductive sheets in Comparative Examples 4 and 5, the base substrate in which the aluminum foil was laminated only on one side was used. Therefore, the shape followability is good, but problems of curl characteristics and shape retentivity arise.

In the conductive sheets in Comparative Examples 6 and 7, the non-woven fabric-enhanced adhesive film was used as the conductive adhesive layer. Therefore, a problem of curl characteristics arises. However, since the base substrate in which the aluminum foil was laminated only on one side was used, problems of shape retentivity and shape followability arise.

INDUSTRIAL APPLICABILITY

In the conductive sheet of the present invention obtained by laminating a conductive adhesive layer on one side of a base substrate and laminating a light-shielding insulating layer on another side of the base substrate, a substrate having a structure in which the same kind of metal layers are formed on respective sides of a resin film is used as the base substrate. Therefore, even when a tension is applied to the conductive sheet, generation of curl can be largely suppressed. This is because the metal layers on respective sides of the resin film show the same coefficients of extension. Further, the sheet can be bonded with shape followability that is good for a changed shape such as a curved surface and a refracted part (corner), and the shape retentivity is excellent. Accordingly, the conductive sheet of the present invention is useful in production of an image display module in which a portion to be electrically connected is disposed in a rough plane, or an image display module in which portions to be electrically connected are disposed on respective different planes.

REFERENCE SIGNS LIST 1 resin film
2 metal layer on the conductive adhesive layer side
3 metal layer on the light-shielding insulating layer side
10 base substrate
20 conductive adhesive layer
30 light-shielding insulating layer
30a black resin layer
30b insulating primer layer
30c mat varnish layer
100 conductive sheet

The invention claimed is:

1. A conductive sheet comprising a base substrate, a conductive adhesive layer laminated on one side of the base substrate and a light-shielding insulating layer laminated on another side of the base substrate, wherein
the base substrate has a structure in which metal layers are formed on respective sides of a resin film, and
the conductive sheet exhibits a shape followability property in that when the conductive sheet is cut into a sample with a length of 15 mm and a width of 10 mm, an absence of peeling is observed in an environment of 80° C. and 95% relative humidity for 72 hours after the sample is bonded to a surface of an aluminum plate, the long side of the sample being bonded to the aluminum plate such that a portion with a thickness of 1 mm of the aluminum plate is surrounded and a 1-mm edge on a surface of the aluminum plate is covered and the remaining sample is bent at 90° and bonded to a back face of the aluminum plate.

2. The conductive sheet according to claim 1, wherein the light-shielding insulating layer of the conductive sheet has a surface having a gloss value of 80% or less, and an optical density of 1 or more.

3. The conductive sheet according to claim 1, wherein the light-shielding insulating layer of the conductive sheet has a surface having a surface resistivity of $1.0 \times 10^8$ Ω/square or more, and the conductive adhesive layer of the conductive sheet has a surface having a surface resistivity of 500 mΩ/square or less.

4. The conductive sheet according to claim 1, wherein the light shielding insulating layer of the conductive sheet has a surface having a surface resistivity of $1.0 \times 10^{10}$ Ω/square or more, a gloss value of 40% or less, and an optical density of 1.2 or more.

5. The conductive sheet according to claim 1, wherein the resin film constituting the base substrate has a linear expansion coefficient of 15 to 100 ppm/° C. and the metal layer has a linear expansion coefficient of 12 to 25 ppm/° C.

6. The conductive sheet according to claim 5, wherein a difference between the linear expansion coefficient of the resin film and the linear expansion coefficient of the metal layers constituting the base substrate is 40 ppm/° C. or less.

7. The conductive sheet according to claim 1, wherein the resin film constituting the base substrate has a modulus of elongation (in accordance with JIS K7113) is 0.3 to 15 GPa, and the metal layer has a modulus of elongation of 45 to 200 GPa.

8. The conductive sheet according to claim 7, wherein a difference between the modulus of elongation (in accordance with JIS K7113) of the resin film and the modulus of elongation of the metal layers constituting the base substrate is 100 Gpa or less.

9. The conductive sheet according to claim 1, wherein the resin film, the metal layer on a side of the conductive adhesive layer, and the metal layer on a side of the light-shielding insulating layer, which constitute the base substrate, are each 5 to 20 μm in a vertical thickness of the resin film.

10. The conductive sheet according to claim 9, wherein a ratio [Mt1]:[Bt]:[Mt2] of a thickness [Mt1] of the metal layer on the side of the conductive adhesive layer, a thickness [Bt] of the resin film, and a thickness [Mt2] of the metal layer on the side of the light-shielding insulating layer is one having values in the range of 0.25 to 4:1:0.25 to 4 in a vertical thickness of the resin film.

11. The conductive sheet according to claim 1, wherein the light-shielding insulating layer is a black resin layer that is formed from an insulating resin colored by a black colorant.

12. The conductive sheet according to claim 11, wherein the black colorant is aniline black.

13. The conductive sheet according to claim 1, wherein the light-shielding insulating layer comprises a black resin layer that is formed from an insulating resin colored by a black colorant, and an insulating primer layer or a mat varnish layer formed on at least one side thereof.

14. The conductive sheet according to claim 13, wherein the black colorant is carbon black.

15. An image display in which a portion to be electrically connected is disposed in a rough plane and is connected by the conductive sheet according to claim 1.

16. An image display in which portions to be electrically connected are disposed on respective different planes and are connected by the conductive sheet according to claim 1.

17. An image display comprising: a display operation panel in which a top electrode provided on an outer edge of a surface of the display operation panel and a back electrode provided on an outer edge of a back face are connected via the conductive sheet according to claim 1 that is disposed so as to surround the outer edge of the display operation panel; and an image display panel that is operated by the display operation panel.

18. An image display in which the conductive sheet according to claim 1 is bonded to the image display so as to surround an outer edge of at least one constituent member thereof.

19. The conductive sheet according to claim 1, wherein the metal layers on respective sides of the resin film show the same coefficients of extension.

* * * * *